(12) United States Patent
Hoshi (10) Patent No.: US 6,181,746 B1
(45) Date of Patent: Jan. 30, 2001

(54) IMAGE DATA DECODING METHOD AND APPARATUS USING MEMORY FOR STORING DECODED DATA (75) Inventor: Takayoshi Hoshi, Kyoto (JP)

(73) Assignee: Rohm Co., LTD, Kyoto (JP)

( * ) Notice: Under 35 U.S.C. 154(b), the term of this patent shall be extended for 0 days.

(21) Appl. No.: 08/786,968

(22) Filed: Jan. 27, 1997

(30) Foreign Application Priority Data

Jan. 26, 1996 (JP) .................................................. 8-011939

(51) Int. Cl.[7] .............................. H04N 7/36; H04N 7/50
(52) U.S. Cl. ...................... 375/240.25; 348/715; 348/716
(58) Field of Search .................................. 398/409, 416, 398/419, 715, 716, 404, 405, 714, 446, 390; 382/233; 375/240.25; H04N 7/36, 7/50

(56) References Cited

U.S. PATENT DOCUMENTS

| 5,561,465 | * | 10/1996 | Fautier et al. | 348/415 |
| 5,754,238 | * | 5/1998 | Koyanagi et al. | 348/415 |
| 5,796,871 | * | 8/1998 | Kawamura et al. | 348/411 |
| 5,828,412 | * | 10/1998 | Fautier et al. | 348/415 |
| 5,835,636 | * | 11/1998 | Auld | 348/714 |

FOREIGN PATENT DOCUMENTS

| 4-250783 | 9/1992 | (JP) . |
| 5-191801 | 7/1993 | (JP) . |
| 5-236466 | 9/1993 | (JP) . |
| 7-23389 | 1/1995 | (JP) . |
| 8-18953 | 1/1996 | (JP) . |
| 9-200568 | 7/1997 | (JP) . |

* cited by examiner

Primary Examiner—Howard Britton
(74) Attorney, Agent, or Firm—Fish & Richardson P.C.

(57) ABSTRACT

Decoding images encoded on MPEG requires I and P pictures to be held for a long period of time for B picture reproduction, resulting in a greater amount of memory capacity necessary. This image data decoding apparatus has a reverse quantization section, a reverse DCT section, a sequence managing section, a motion compensating section, and a DRAM control section. Reverse quantization and reverse DCT operations are performed on input encoded image data. The sequence managing section determines the type of input pictures and detects sequences where more than one B picture is continuously input. I and P pictures are necessary for the decode operation of B pictures, so they are held in any frame bank. However, a B picture which has already been displayed is unnecessary, so one bank is shared by two B pictures which are continuously input. This results in a smaller number of necessary banks.

16 Claims, 7 Drawing Sheets

| x \ y | $B_n$ | $B_{n+1}$ | $B_{n+2}$ | $B_{n+3}$ | $B_{n+4}$ | $B_{n+5}$ | $B_{n+6}$ |
|---|---|---|---|---|---|---|---|
| 0 | 0 | 4 | 8 | 12 |  | 1 | 5 |
| 1 | 1 | 5 | 9 | 13 |  | 2 | 6 |
| 2 | 2 | 6 | 10 | 14 |  | 3 | 7 |
| 3 | 3 | 7 | 11 |  | 0 | 4 | 8 |
| 4 | 4 | 8 | 12 |  | 1 | 5 | 9 |
| 5 | 5 | 9 | 13 |  | 2 | 6 | 10 |
| 6 | 6 | 10 | 14 |  | 3 | 7 | 11 |
| 7 | 7 | 11 |  | 0 | 4 | 8 | 12 |
| 8 | 8 | 12 |  | 1 | 5 | 9 | 13 |
| 9 | 9 | 13 |  | 2 | 6 | 10 | 14 |
| 10 | 10 | 14 |  | 3 | 7 | 11 |  |
| 11 | 11 |  | 0 | 4 | 8 | 12 |  |
| 12 | 12 |  | 1 | 5 | 9 | 13 |  |
| 13 | 13 |  | 2 | 6 | 10 | 14 |  |
| 14 | 14 |  | 3 | 7 | 11 |  | 0 |
| ↓ | ↓ | ↓ | ↓ | ↓ | ↓ | ↓ | ↓ |
| 15 |  | 0 | 4 | 8 | 12 |  | 1 |
| 16 |  | 1 | 5 | 9 | 13 |  | 2 |
| 17 |  | 2 | 6 | 10 | 14 |  | 3 |
| 18 |  | 3 | 7 | 11 |  | 0 | 4 | x: PHYSICAL NUMBER OF MACROBLOCK AREA
y: PICTURE TO BE DECODED

Fig. 11

IMAGE DATA DECODING METHOD AND APPARATUS USING MEMORY FOR STORING DECODED DATA

DETAILED DESCRIPTION OF THE INVENTION

1. Field of the Invention

This invention relates to an image data decoding method and apparatus and, more particularly, to a method and apparatus for decoding encoded input image data, storing them in display units into a memory, and reading the decoded data in display units to display. This invention can be applied, for example, to an MPEG decoder.

2. Description of the Prior Art

Improving technology for compressing images into codes and storing them into various record media such as a CD-ROM and a DAT has become popular; their representative is the international encoding standards MPEG. Today home appliance manufacturers and computer manufacturers are making efforts at developing multimedia information home appliances and are intending to market goods which meet MPEG. Here is a brief description of the processing based on MPEG.

Figure 1:
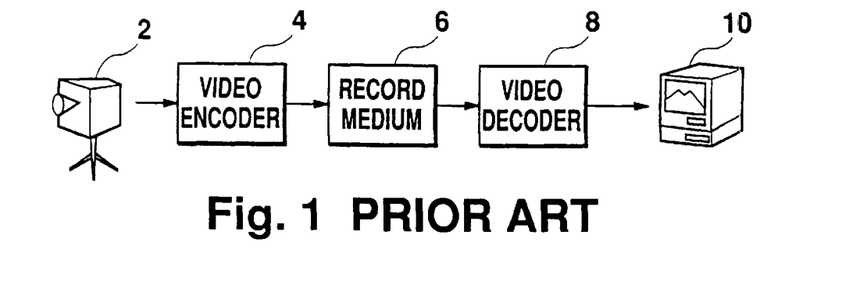
FIG. 1 is a typical diagram showing the flow of encoding and decoding images based on MPEG.

FIG. 1 is a typical diagram showing the flow of encoding and decoding images based on MPEG. As shown in FIG. 1, images input from an image input device 2, such as a camera, are compressed and encoded by a video encoder 4. Quantization processes and DCT (discrete cosine transform) are usually involved in encoding. Encoded data is written into a record medium 6.

Decoding follows the reverse process: data is read from the record medium 6 and decoded by a video decoder 8. Decoding is preceded by a reverse quantization process and reverse DCT. Decoded image data by the video decoder 8 are output in a displayable format at displayable timing and reproduced and displayed by a display device 10. Decoding is performed with forward prediction from past reproduced images and reverse prediction from future reproduced images (bidirectional prediction), as necessary.

Figure 2:
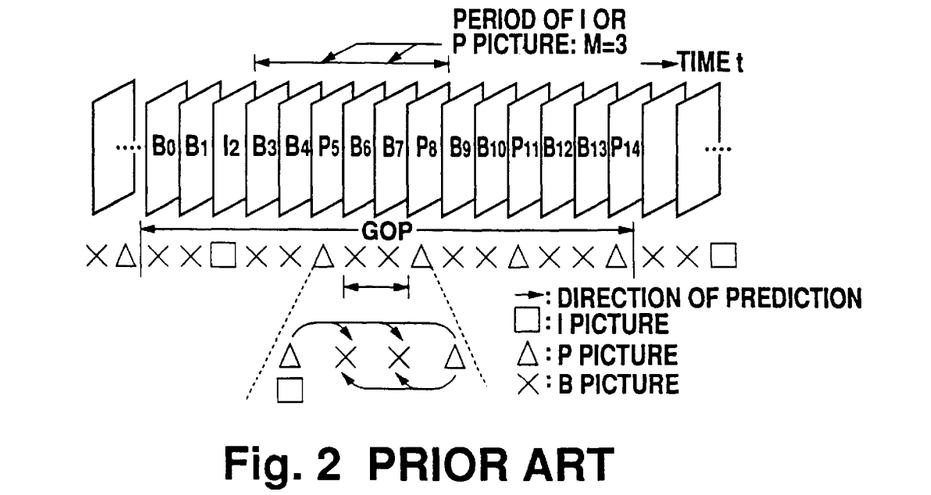
FIG. 2 is a schematic diagram of a GOP (group of pictures) of MPEG.

FIG. 2 is a schematic diagram of a GOP (group of pictures) of MPEG. Fifteen screens in FIG. 2 (called pictures in MPEG) can be regarded to be taken in this order. These fifteen pictures, called a GOP in MPEG, form one predictive process unit. That is, encoding and decoding can be done through cross reference to pictures within a GOP, which section that a GOP is a unit of random access. Motion images can be encoded and decoded by continuously processing sets, each of which is comprised of one GOP and its sequence header. As shown in FIG. 2, there are three kinds of pictures: I, P, and B. An I picture (image encoded within its frame) is limitedly encoded within its own frame and reference to other pictures is not necessary for decoding. A P picture (image encoded with forward prediction) requires forward prediction; only past reproduced images are necessary for decoding. However, a B picture (image encoded with bidirectional prediction) requires bidirectional prediction; I and P pictures which are reproduced after the B picture will also be referred. In FIG. 2 the direction of prediction is shown with an arrow. When a GOP is actually encoded, the data of I or P pictures input after the B picture must be known. Therefore, I2 picture, for example, is encoded before B0 and B1 pictures and the encoded data is written into the record medium 6. In FIG. 2, a cycle M of I or P pictures applied to bidirectional prediction is three.

Figure 3:
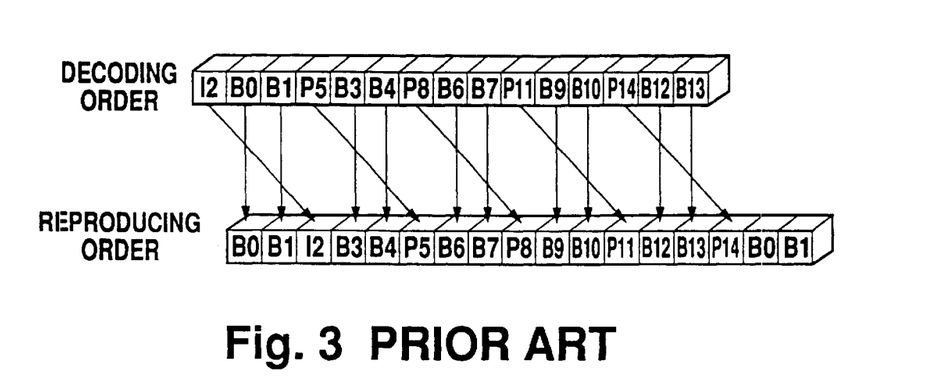
FIG. 3 is a diagram showing the decoding and reproducing order based on MPEG.

FIG. 3 is a diagram showing the decoding and reproducing order based on MPEG. The upper row of FIG. 3 indicates the decoding order; the lower row indicates the reproducing order. The decoding order is the same as the encoding order; that is, the decoding order corresponds to the order in which pictures are arranged in the record medium 6. Therefore, on the decoding side, I2, B3, B4, . . . pictures are read in this order from the record medium 6, decoded, re-ordered and then output in the original order. In FIG. 3, the I2 picture must not be output before the B0 and B1 pictures, so the I2 picture is held in an internal memory until the B0 and B1 pictures are output. Similarly, other I and P pictures must be held in a memory until their corresponding B pictures are output. As shown in FIG. 3, decoded B pictures are output as soon as possible in order to adopt a small capacity memory.

Figure 4:
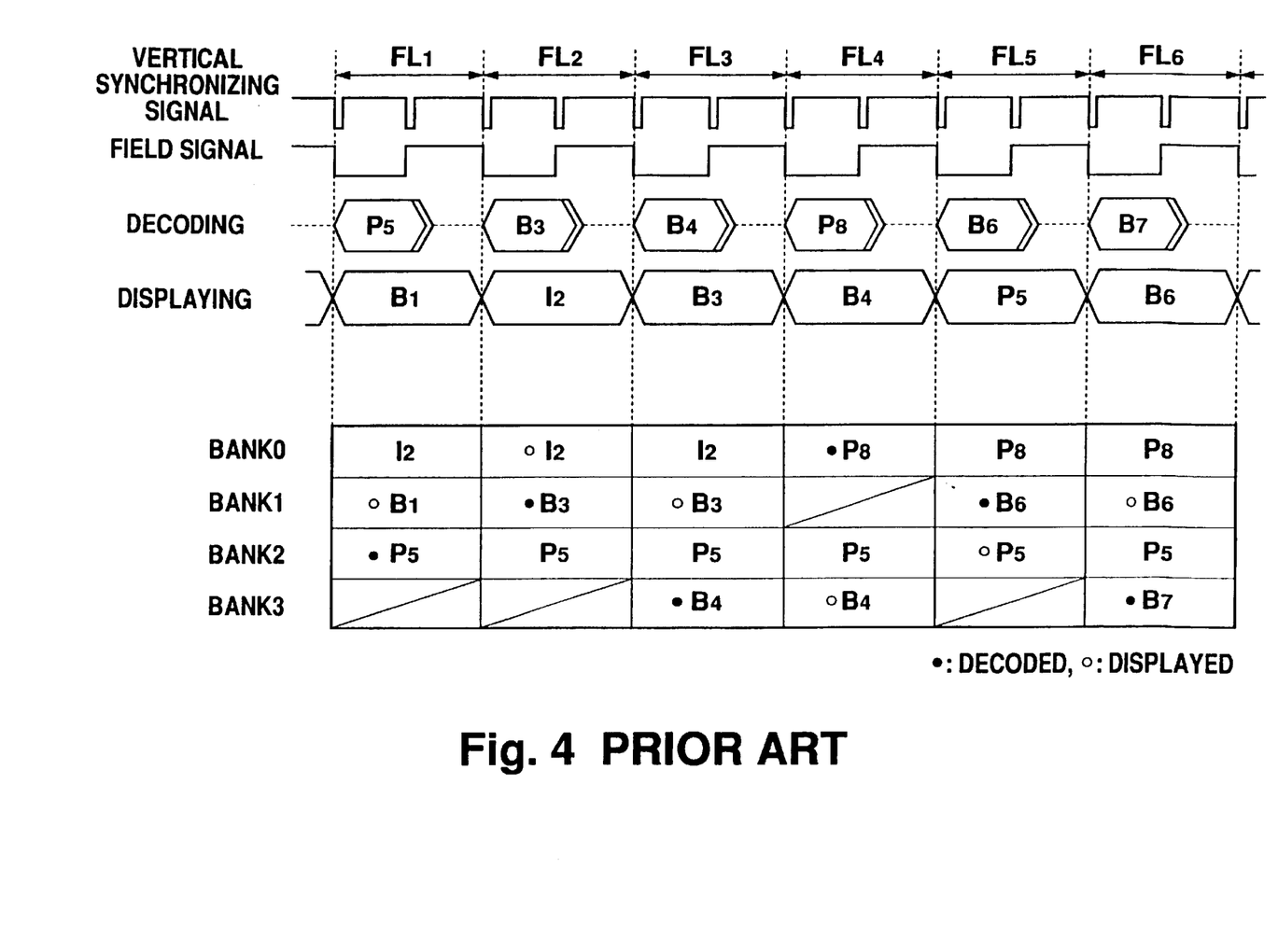
FIG. 4 is a diagram showing the process timing of decoding and displaying by the conventional video decoder 8.

FIG. 4 is a diagram showing the process timing of decoding and displaying by the conventional video decoder 8. The lower part of FIG. 4 shows memory banks in the video decoder 8 and pictures held in each bank at each timing. This memory has 4 banks for the reason described below. Each bank corresponds to an area in which one frame (one picture) of data is stored.

As shown in FIG. 4, periods of frames FL1–6 depend on vertical synchronizing signals. Each frame period consists of two field periods. It is assumed that the low state of a field signal indicates the first field period and the high state of the field signal indicates the second field period.

In FIG. 4, the time at which I2, B0, and B1 pictures of some GOP have already been decoded is the starting point of FL1. Subsequently, P5, B3, B4, . . . pictures will be decoded as in the decoding order of FIG. 3. However, with display operation, the starting point of FL1 occurs only when the B0 picture has been displayed. Subsequently, the B1, I2, . . . pictures are displayed as in the reproducing order of FIG. 3. Decode and display operation in each frame period will be described below.

(1) FL1

The B1 picture is displayed. To do this, the B1 picture is held in a bank (assumed to be a bank 1) until the end of FL1. The I2 picture to be displayed in FL2 is still held in another bank (assumed to be bank 0). Apart from display operation, the P5 picture is decoded. To store the decoded data, still another bank (assumed to be a bank 2) is assigned. Decoding is done in macroblocks (one macroblock is 16 pixels by 16 lines) and data is stored in macroblocks in a memory. In this frame a bank 3 is an empty area (unused).

(2) FL2

The I2 picture is displayed. The I2 picture is held in bank 0 until the end of this frame. The P5 picture to be displayed later is still held in the bank 2. The data of the B1 picture which has already been displayed is unnecessary; therefore, bank 1 is assigned to the B3 picture to be decoded. In this frame, too, the bank 3 is an empty area.

(3) FL3

The I2 picture had been displayed, but it is still held in bank 0 because the reference to the I2 picture is needed for the B4 picture which is being decoded. The B3 picture which is being displayed and the P5 picture to be displayed later stay in the banks. The B4 picture which is being decoded is stored in macroblocks in bank 3. To achieve this, the memory must have four banks.

In this way a timing chart of FIG. 4 is obtained according to the rules: "a B picture which has been already displayed is unnecessary" and "I and P pictures are held for a certain period to decode the B pictures between them." As shown in FIG. 4, all four banks are used every three frame periods (FL3, 6, 9, . . . ).

As is stated, the conventional video decoder 8 needs memory having four banks to hold a decoded picture until the subsequent B pictures are decoded and to hold the present picture until it is actually displayed.

Memory capacity necessary to reserve four banks will be described below. For a screen of an NTSC system having 352 pixels×240 lines, one frame corresponds to about 123.8 Kbytes of data. Four frames have 495.2 Kbytes of data. In addition, a 40–50 Kbyte temporary buffer called a VBV buffer should be prepared with MPEG, resulting in a total capacity of about 540–550 Kbytes. This exceeds 4 Mbits, and so one 4 Mbit DRAM will result in a shortage of capacity. For a screen of a PAL system having 352 pixels× 288 lines, one frame corresponds to about 148.5 Kbytes of data. Thus, the same problem occurs.

For the above reason, the conventional video decoder 8 increases its memory capacity, for example, by adding one 1 Mbit DRAM to one 4 Mbit DRAM. To make an apparatus smaller and less expensive, it is desirable to use only one 4 Mbit DRAM. To solve this problem, the following method, for example, based on the above prior art is possible. A B picture which cannot be stored in a memory is discarded every three frames and the picture displayed in the preceding frame is displayed twice. However, such relaxation of specifications will result in lowering image quality, and so is not desirable.

SUMMARY OF THE INVENTION

This invention solves the above problem. Its object is to provide methods and apparatus for using a memory having three banks in the above example while maintaining image quality. In order to accomplish this object, one feature of this invention includes using the same memory bank for reading to display and writing decoded data.

An image data decoding method according to the present invention relates to a method of decoding encoded input image data, storing it in display units into each unit store area in a memory, and reading the decoded data in display units to display. The "display unit" is what comprises a certain unit in display operation. It includes one screen, a frame, and an MPEG picture. The "unit store area" is an area where this display unit of data is stored. It corresponds to one frame of storage area in a frame memory. In this invention it is assumed that the number of unit store areas in a memory is less than the maximum number of display units held in the memory in order to achieve continuous display at the same time. The "continuous display" is a state of display units being displayed in a correct and smooth manner in the determined order in the determined display periods. With the above prior art, the "maximum number of display units to be held in a memory at the same time" is four. Therefore, under the same condition as the above prior art, this invention would be applied to cases where the number of unit store areas is less than or equal to three.

Based on this assumption, this invention decodes image data and then stores the decoded data collectively in display units into empty unit store areas, if any. The decoded data may be stored in display units into empty unit store area even if the decoded data is not displayed. On the other hand, when there is no empty unit store area to store decoded image data, store operation is delayed until the read operation of decoded data in any unit store area for display starts. When the data in that unit store area is read, the decoded image data is stored, in turn, in parts which become empty with the read operation resulting in a whole display unit of data being stored. In this case store operation may stop depending on read conditions.

According to one aspect of the present invention, conditions are as follows: input image data is encoded on an MPEG, the above display unit is an MPEG picture, an occurrence cycle of I or P pictures is greater than or equal to three, and a memory has a capacity which is less than the amount necessary to reserve four unit store areas. It is assumed that B pictures are continuously input under these conditions. When a B picture input at an early stage (tentatively called an "early picture") is read from a unit store area, the data of a B picture input at a late stage (tentatively called a "late picture") is stored, in turn, into parts which become empty with the read operation. At that time the same unit store area is temporarily shared by the data of two B pictures. A B picture which has been read need not be held, so read parts can be overwritten. For example, when 20% of a unit store area has been read, a late picture is overwritten on this 20% part and the rest of 80% part is still occupied by an early picture. This enables one unit store area to be effectively used by two pictures.

An image data decoding apparatus of the present invention includes an input section for inputting image data encoded with an encoding technology with bidirectional prediction, a determining section for determining whether input image data is encoded with bidirectional prediction, a decoding section for decoding input image data, and a memory control section for storing decoded image data into a memory and reading image data to be displayed from the memory in each frame display period. Encoding technology on bidirectional prediction includes MPEG; data encoded with bidirectional prediction includes B picture data. In this configuration, when a memory has no empty area to store decoded image data, the memory control section monitors the memory areas where data encoded with bidirectional prediction has already been stored. And when data in these areas is read, the memory control section stores data, in turn, into parts which become empty with the read operation.

According to the image data decoding methods and apparatus of the present invention, good images can be decoded and displayed with fewer memory banks than were originally necessary. This results in a smaller amount of necessary memory capacity, and in turn, a smaller and less expensive apparatus. There is no need to relax specifications, which can avoid lowering image quality. Making effective use of memory areas other than banks contributes to a reduction in decode time.

DESCRIPTION OF THE PREFERRED EMBODIMENTS

Preferred embodiments of an image data decoding apparatus of the present invention will be described below. This apparatus will demonstrate the image data decoding methods of this invention.

Embodiment 1

Figure 5:
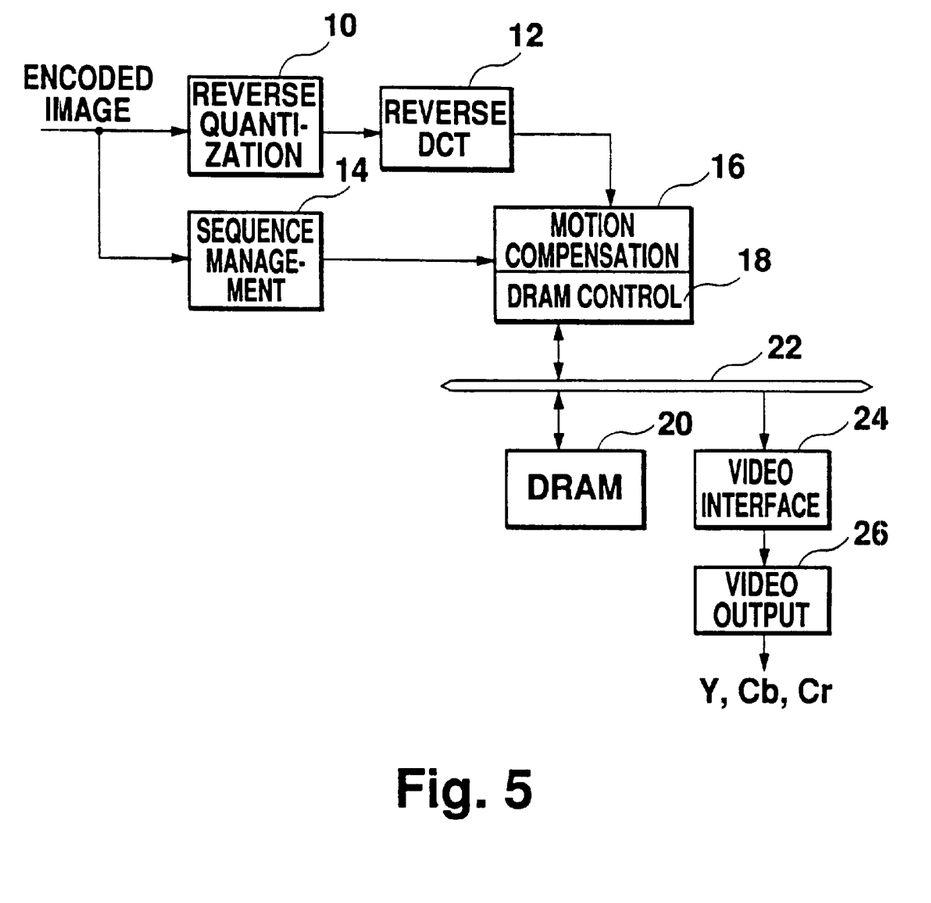
FIG. 5 is an overall schematic diagram of an image data decoding apparatus of embodiment 1.

FIG. 5 is an overall schematic diagram of an image data decoding apparatus of embodiment 1. Referring to FIG. 5, first of all, the decode process will be outlined. In this embodiment one 4 Mbit DRAM 20 is used as a memory for storing decoded data. The DRAM 20 has three banks.

The image data decoding apparatus has a reverse quantization section 10 for performing a reverse quantization process of inputted encoded images; a reverse DCT section 12 for performing reverse DCT processes; a sequence managing 14 for identifying, for example, the type of pictures from the sequence headers of the bit stream of encoded images and providing timing signals necessary for motion compensation and DRAM control (described below) and picture identifying signals; a motion compensating section 16 arranged behind the reverse DCT section 12 for compensating motion on motion vectors used for forward and reverse prediction; and a DRAM control section 18 for generating addresses relative to a DRAM 20, RAS/CAS, etc. under instructions from the motion compensating section 16 and controlling the write operation of decoded data and read operation of displayed data. As a result of the motion compensation, the type and timing of the access to the DRAM 20 become clear, while the motion compensation is performed with the data read from the DRAM 20. Therefore, the motion compensating section 16 and the DRAM control section 18 may be united in terms of circuit structure.

Figure 7:
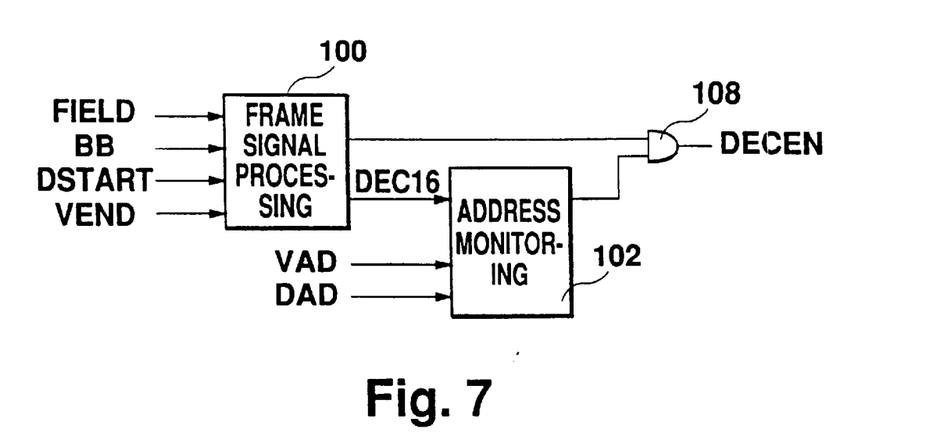
FIG. 7 is a diagram showing a method of controlling the timing of the decode operation of continuous B pictures by the DRAM control section 18.

A DRAM bus 22 is a data bus where the data to be written into the DRAM 20 and the data read therefrom temporarily flow. A video interface section 24 is connected to this bus in order to input the display data read onto the bus and transmit them to a video output section 26. The video output section 26 outputs video signals Y (intensity), Cb (blue color difference), and Cr (red color difference) to a display device (not shown). The features of this preferred embodiment include sequence managing section 14 for determining the continuous input of B pictures and the DRAM control section 18 for storing decoded data into the unit store areas which become empty with the read operation of displayed data. FIG. 7 is a diagram showing a method of controlling the timing of the decode operation of continuous B pictures by the DRAM control section 18. In FIG. 7, "FIELD" represents the field signal of FIG. 4; "BB" is a signal continuously active (high) when two or more B pictures are input in succession; "DSTART" is a signal representing the earliest time at which decode operation can be started; "VEND" is a signal representing the time at which the read operation of displayed (video) data is complete; "VAD" is a signal representing the address for display operation; "DAD" is a signal representing the address for decode operation; and "DEC16" is an indicating signal to start decode operation in order to perform the follow-up decode operation of the addresses which have been displayed. Display and decode operations are performed in macroblocks, so the follow-up decode operation is at least sixteen lines behind display operation. As described below, DSTART is active only in the first field of the second B picture among ones continuously input. Similarly, DEC16 is active only in the second field.

In FIG. 7, a frame signal processing section 100 generates the first timing at which a follow-up decode operation is to begin. The frame signal processing section 100 receives FIELD, BB, DSTART, and VEND and outputs a decode permission signal and DEC16. The former is provided to an AND gate 108 and the latter is provided to an address monitoring section 102. The address monitoring section 102 monitors the progress of VAD and DAD by comparing them during follow-up decode operations. The address monitoring section 102 begins its monitoring operation with DEC16 as a trigger. If decode operation proves to be too fast for the monitoring operation, the decode permission signal is low-masked by the AND gate 108. The decode permission signal DECEN finally obtained is output from the AND gate 108 and is referred in the decode process circuits (not shown) behind the AND gate 108. overall processing operation will be described below. When an encoded image is input, its type is identified in the sequence managing section 14. If it is an I picture, the decode operation will be completed through the reverse quantization, the reverse DCT, and the motion compensation processes as a normal procedure, because the decode operation can be done only by a reference to that picture. The decoded data is stored, in turn, into the empty banks of the DRAM 20 in macroblocks. Since an I picture is decoded first in the GOP, the DRAM 20 has empty banks. There is no problem about storing the decoded data. If an encoded image are a P picture, the same processing is performed since three banks in the DRAM 20 is sufficient for decoding a P picture, as shown in FIG. 4.

Figure 6:
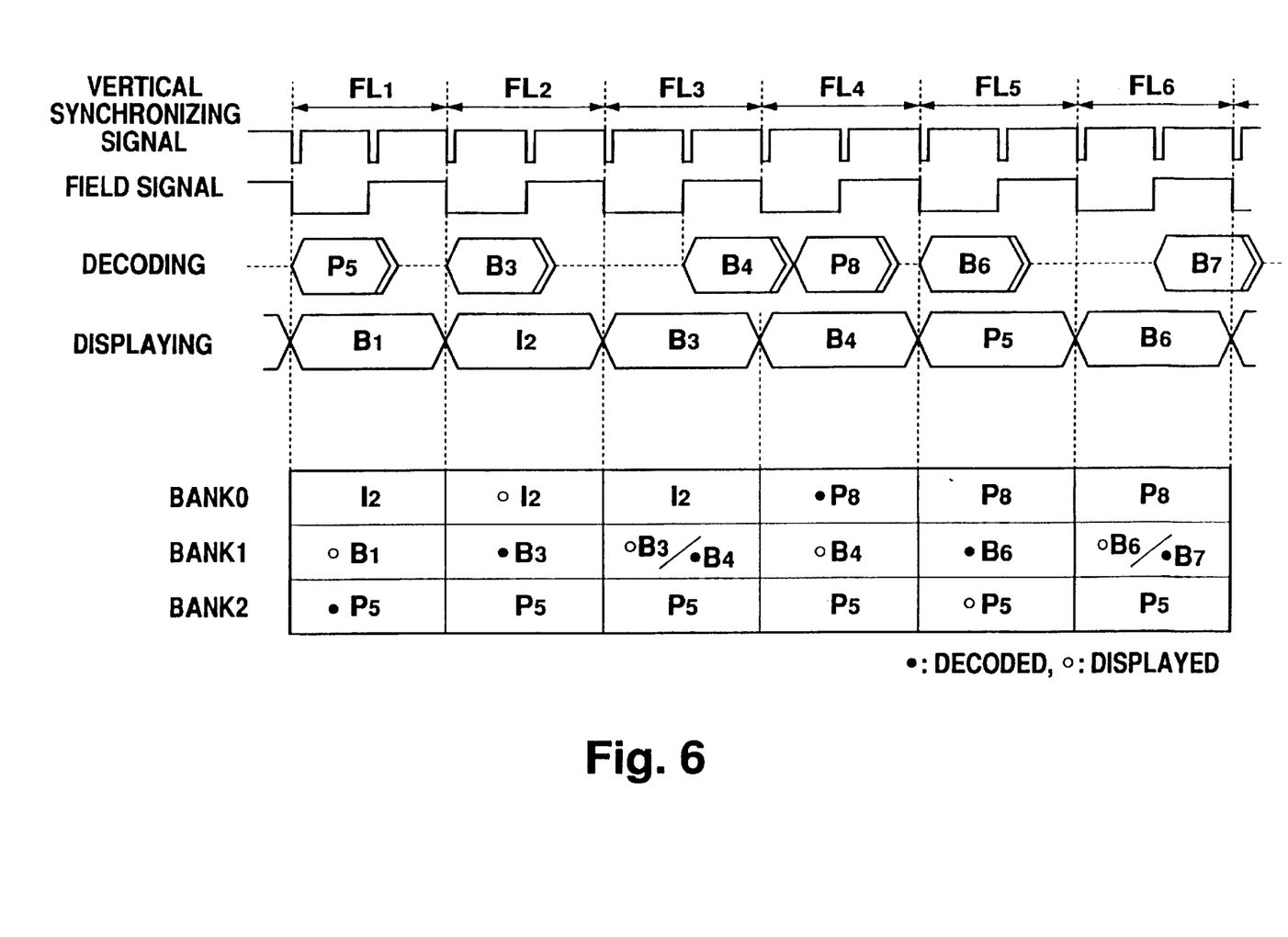
FIG. 6 is a diagram showing the timing of the decode and display processes in an image data decoding apparatus of embodiment 1.

But if an encoded image is a B picture, this doesn't apply. FIG. 4 shows that in the frame periods FL3 and FL6 when the second B picture among ones continuously input is decoded, four banks are necessary in a conventional apparatus. FIG. 6 is a diagram showing the timing of the decode and display processes in this apparatus. For example, bank 1 becomes empty at the end of frame period FL1. Therefore, the decode operation of the B3 picture begins the moment frame period FL2 starts. The start and end of the frame periods FLs are indicated in FIG. 6 by the vertical dashed lines. However, at the end of the frame period FL2, there is no empty bank-picture B3 has been decoded, but not yet displayed and picture B4 is the next image to be decoded. Therefore, the start of the decode operation of picture B4 is delayed by a given time from the start of the frame period FL3. FIG. 6 shows that in FL3 and FL6, a bank 1 is shared by the two B pictures. (Hereinafter, frame display periods such as FL3 and FL6 are referred to as "shared periods.") A conventional device cannot originally hold two frames of data in one bank, but this apparatus can achieve this by the method shown in FIG. 7.

Figure 8:
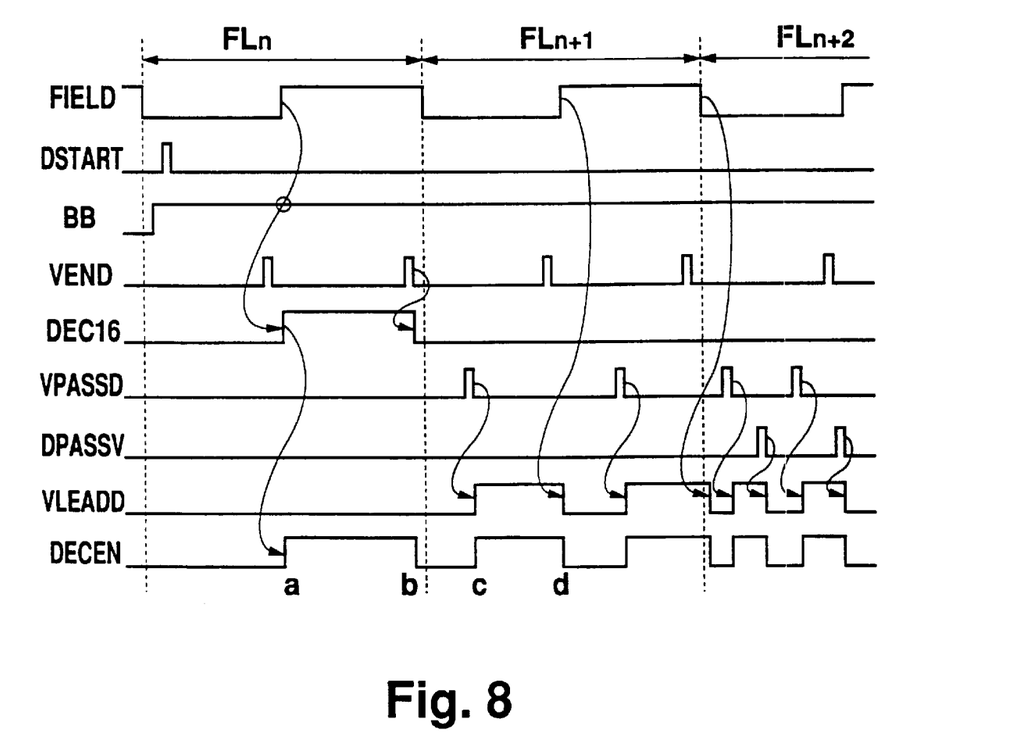
FIG. 8 is a timing chart showing the follow-up decode operation using the method shown in FIG. 7.

FIG. 8 is a timing chart showing the follow-up decode operation using the method shown in FIG. 7. There are three B pictures $FL_n$–$FL_{n+2}$ in FIG. 8. FLn is the second B picture; $FL_{n+1}$ is the third one; and $FL_{n+2}$ is the fourth one. In FIG. 8, VPASSD is a pulse signal which becomes active when a display operation gets ahead of a decode operation; DPASSV is a pulse signal which becomes active when a decode operation gets ahead of a display operation; and VLEADD is a status signal which is active when a display operation is ahead of a decode operation. VLEADD is toggled according to VPASSD and DPASSV. In this embodiment, DECEN is generated, as an example, by logical OR between DEC16 and VLEADD.

In FIG. 8, BB first becomes active in $FL_n$ and DSTART becomes active only once. For I and P pictures decode operation starts on the assertion of DSTART, but in this embodiment the start of decode operation is delayed until the start of the second field in the FLs where BB is active. As a result, DEC16 and DECEN become active from the second field (point a). The assertion of DEC16 occurs only at the second B picture; and while DEC16 is active, the decode process circuits prepare a follow-up decode with a delay of sixteen lines by adjusting the decode speed. That is, follow-up decode operation is accomplished while DEC16 is active. In the pictures subsequent to $FL_n$, the maintenance of the follow-up decode operation can be performed only by monitoring addresses.

DEC16 is negated with the negation of VEND (point b). At that time DECEN is also negated and decode operation stops. Only display operation is performed. When the display operation gets ahead of the decode operation after one cycle, VLEADD becomes active and the decode operation restarts (point c). The preceding status of the display operation should be reset in a new field, so that DECEN is also negated (point d). As a result the decode operation stops once again. Subsequently, VLEADD behaves based on the reset operation at the change points of fields and the toggle operation according to VPASSD and DPASSV; and DECEN is controlled.

The above is a method of accomplishing shared periods using a follow-up decode operation. Note that the start of the decode operation of the B4 picture is delayed, so its decode operation may be completed in FL4. But in this case the display operation of the B4 picture in FL4 is performed from the beginning of the frame; therefore, while a part near the start is displayed, the decode process of the rest will be completed.

In this embodiment the description has been focused on a case where two B pictures are continuously input (M=3 in FIG. 2); but even if more than two B pictures are continuously input (M>3), three banks in the DRAM 20 will do according to an apparatus of this invention. Assuming that, subsequent to I2 picture, B3, B4, B5, and B6 pictures are continuously input, the bank1 of FIG. 6 is shared by two pictures in the frames subsequent to FL2 : B3/B4, B4/B5, B5/B6. That is, a larger value of M simply results in the continuous occurrence of shared periods.

An apparatus of this embodiment can be incorporated into an LSI circuit. In this case the reverse quantization section 10, the reverse DCT section 12, the sequence managing section 14, the motion compensating section 16, and the DRAM control section 18 of FIG. 5 can be integrated into one chip.

Embodiment 2

In embodiment 1, the start of the decode operation of the subsequent B picture in a shared period is delayed until the start of the second field. In FIG. 6, as stated above, the decode operation of the B4 picture starting in FL3 may be completed in FL4, which naturally has its delay limits. In the embodiment 2, an apparatus for starting the decode operation in the first field of a shared period with the memory areas other than the three bank areas will be disclosed.

Figure 9:
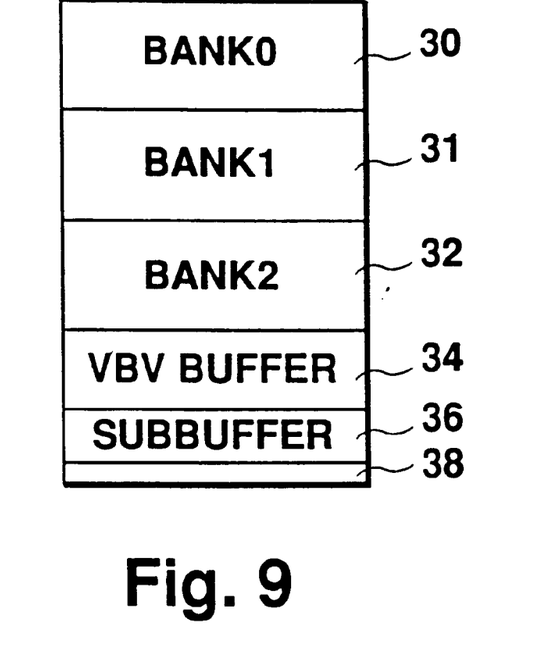
FIG. 9 is a schematic diagram of a memory map of a DRAM 20 in an apparatus of embodiment 2.

FIG. 9 is a schematic diagram of a memory map of a DRAM 20 in an apparatus of embodiment 2. As shown in FIG. 9, the DRAM 20 has banks 0–2 (numbered 30–32 respectively) and a VBV buffer 34. In addition, this embodiment is characterized by a subbuffer 36 for decoded data. The area smaller than the minimum area available for a subbuffer is shown as a fragmentary area 38 (unused).

Figure 10:
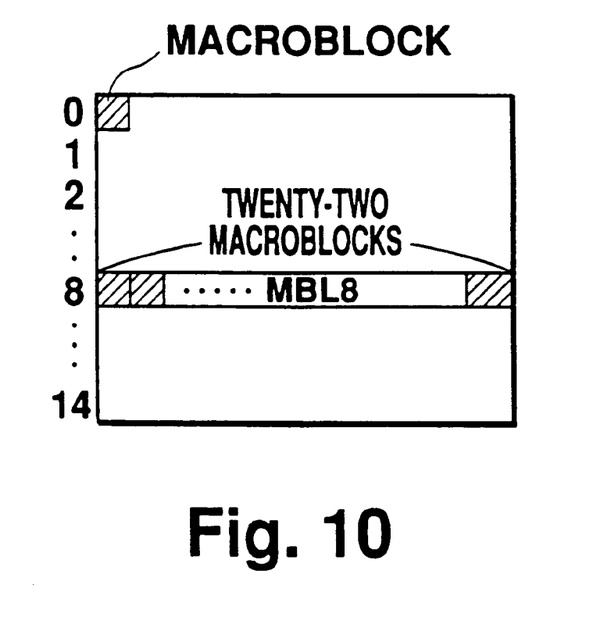
FIG. 10 is a diagram showing the relationship between one frame and macroblock lines.

With NTSC, one frame is comprised of 22-by-15 macroblocks. The twenty-two horizontal macroblocks together are referred to as a macroblock line. Therefore, one frame is comprised of fifteen macroblock lines which pile up. FIG. 10 is a diagram showing the relationship between one frame and macroblock lines (MBLs). In FIG. 10 fifteen MBLs are numbered MBL0, 1, . . . , 14 from the top and an MBL8 is depicted as an example. Each MBL corresponds to 352 (16×22) pixels×16 lines. Each of the banks 0–2 of FIG. 9 is comprised of fifteen MBLS. In the case of a 4 Mbit DRAM, areas corresponding to about four MBLs can be reserved for the subbuffer 36 with the areas for the VBV buffer 34 subtracted. Here it is assumed that they correspond to four MBLS.

Figure 11:
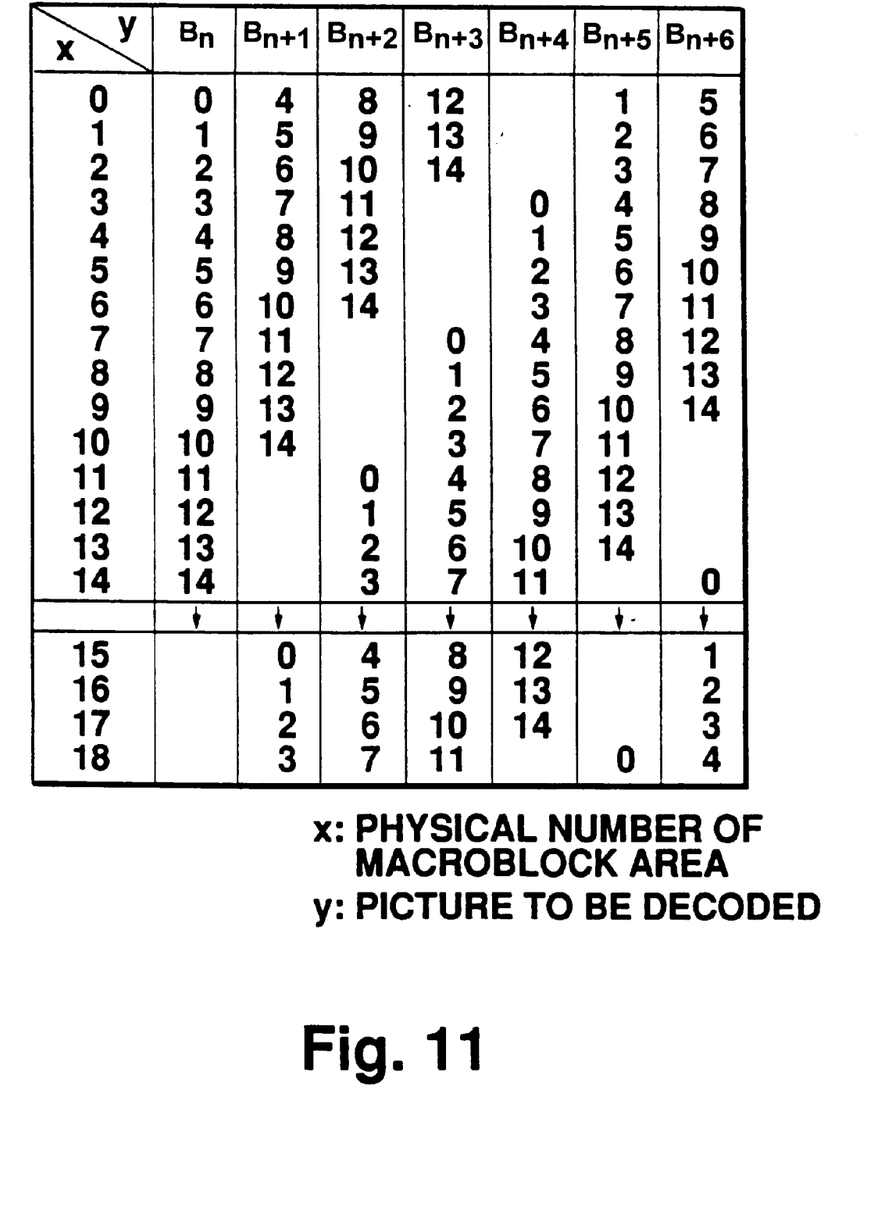
FIG. 11 is a diagram showing the MBL areas of the specific bank and the subbuffer 36 in the DRAM 20 where MBL 0–14 of each B picture, continuously input, are stored.

In this embodiment, it is assumed, for descriptions, that only B pictures are continuously input. FIG. 11 is a diagram showing the MBL areas of the specific bank and the subbuffer 36 in the DRAM 20 where MBLs 0–14 of each B picture continuously input are stored. A $B_n$ picture is the first B picture, a $B_{n+1}$ picture is the second one, etc. When B pictures are continuously input, one particular bank is shared as shown in FIG. 6. It is assumed that this is a bank that may correspond to bank 0, bank 1, or bank 2 of FIG. 6 A.

"x" of FIG. 11 represents fifteen MBL storing areas in the bank A numbered 0–14 (physical addresses). The numbers 15–19 are given to the subbuffer 36 as its physical addresses. Instead of these numbers, symbols PMBL 0–18 are used in order to indicate that they are physical addresses.

"y" of FIG. 11 represents decoded pictures. The numbers 0–14 under each picture are the numbers of fifteen MBLs comprising that picture, which correspond to their logical addresses. The logical addresses of a $B_i$ picture are represented as $LMBL_i$ 0–14.

The decode and display operation in an apparatus of this embodiment will be described below.

In FIG. 11, the decode operation of the $B_n$ picture starts first. The $B_n$ picture is the first B picture and the bank A is empty; therefore, $LMBL_n$ 0–14 are stored into PMBL 0–14.

Subsequently, the decode operation of the $B_{n+1}$ picture begins. In embodiment 1, its start is delayed until the start of the second field, but in this embodiment the decode operation starts immediately from the first field, for example, as with I pictures. The beginning of the decoded data $LMBL_{n+1}$ 0–3 corresponding to four MBLs is stored into the empty PMBL 15–18 in the subbuffer 36. Therefore, there is no need to wait until the bank A is read.

During this store operation, reading the B, picture to display is concurrently performed. At least $LMBL_n$ 0 is considered to have been read until the store operation into PMBL 15–18 is completed, so that PMBL 0 is overwritten with $LMBL_{n+1}$ 4, and if the read operation of $LMBL_n$ 0 is not completed, waiting until it is completed. Subsequently, the decode and store operation of the $B_{n+1}$ picture is performed while monitor operation is performed, as in the embodiment 1, so that the decode operation does not get ahead of the display operation.

Next, the decode operation of the $B_{n+2}$ picture is performed. As shown in FIG. 11, up to PMBL 10 are occupied by the $B_{n+1}$ picture, so $LMBL_{n+1}$ 0 is stored in PMBL 11. Subsequently, the decoded data is cyclically stored into empty addresses of PMBL 0–8 in the same way, which can advance the start time of the decode operation. As a result, even if a picture which takes a long time in the decode operation is input, sufficient decode time can still be reserved. While what has been described are, at present, considered to be preferred embodiments of the invention, it will be understood that various modification may be made thereto, and it is intended that the appended claims cover all such modifications falling within the true spirit and scope of the invention.

What is claimed is:

1. A method of decoding encoded input image data associated with input images, storing the decoded input image data in frames in unit store areas in a memory, and reading the decoded input image data in frames for display, the method comprising:

setting the number of unit store areas in the memory to a value less than the maximum number of frames associated with continuous display;

when there is an available unit store area that is empty or contains data not needed for subsequent decoding or display at a beginning of a frame display period, initiating a decode operation of a particular input image substantially at a same time as the beginning of the frame display period to produce decoded input image data, and storing the decoded input image data as a frame in the available unit store area;

when there is no unit store area that is empty or that contains data not needed for subsequent decoding or display at the beginning of a frame display period, initiating a decode operation of the particular input image at a given time that is delayed from the beginning of the frame display period to produce decoded input image data and storing the decoded input image data in parts of a unit store area from which a frame is being read for display as the unit store area becomes available when decoded input image data in that unit store area are read for display.

2. A method according to claim 1, wherein when there is no unit store area that is empty or that contains data not needed for subsequent decoding or display at a beginning of a frame display period, said parts that become available with the read operation are detected by comparing an address of input image data currently displayed and an address of input image data currently decoded.

3. A method according to claim 1, wherein at a start of a first frame display period, when more than one image encoded with bi-directional prediction is continuously input, the start of the decode operation of the image subsequent to the first bi-directional image is delayed by the given time from the start of a second frame display period that is subsequent to the first frame display period, and the decode operation of the first bi-directional image begins substantially as soon as the first frame display period starts.

4. A method according to claim 3, wherein said given time is one field period.

5. A method according to claim 1, wherein without regard to whether an available unit store area exists, the decode operation of input image begins substantially as soon as a frame display period starts; and when there is no available unit store area at a beginning of a frame display period, decoded input image data is stored in turn in a remaining available area of the memory other than the unit store areas.

6. A method according to claim 5, wherein the capacity of said remaining available area of the memory is smaller than that of one unit store area.

7. A method according to claim 5, wherein when said remaining available area of the memory is occupied by decoded input image data, store operation is delayed until the read operation of decoded input image data in any unit store area for display starts, and when the input image data in that area is read, the remaining decoded input image data is stored, in turn, in parts that become available with the read operation.

8. A method according to claim 7, wherein when said remaining available area of the memory is occupied by decoded input image data, said parts that become available with the read operation are detected by comparing an address of input image data currently displayed and an address of input image data currently decoded.

9. A method according to claim 1, wherein said input image data is encoded in the MPEG format, said input image is a picture, an occurrence cycle of I or P pictures is greater than or equal to three, said memory has a capacity which is less than the amount necessary to reserve four of said unit store areas, and when B pictures are continuously input and a B picture input in an early stage is read from a unit store area, data of a picture input in a late stage is stored, in turns in the parts that become available with the read operation thus allowing the same unit store area to be temporarily shared by the data of two B pictures.

10. A method according to claim 9, wherein said parts that become available with the read operation are detected by comparing an address of input image data currently displayed and an address of input image data currently decoded.

11. An image data decoding apparatus comprising:

an input section for inputting image data associated with images and encoded with an encoding technology with bi-directional prediction;

a determining section for determining whether an input image is encoded with bi-directional prediction;

a decoding section for decoding input images; and a memory control section for storing decoded input images into frames in a memory and reading decoded input images to be displayed from the memory in each frame display period;

wherein when said memory has no available area to store data at a start of a frame display period, said memory control section monitors the memory areas where data encoded with bi-directional prediction has already been stored and, in case of data in these areas being read, stores data, in turn, in parts that become available with the read operation; and wherein when said memory has an available area to store data at a start of a frame display period, the decoding section begins decoding the next image substantially as soon as the frame display period starts.

12. An apparatus according to claim 11, wherein said memory control section detects said parts that become available with the read operation by comparing an address of image data currently displayed and an address of image data currently decoded.

13. A method of decoding image data associated with images, storing the decoded image data in frames into each unit store area in a memory, and reading the decoded image data in frames to display, the method comprising:

setting the number of unit store areas in the memory to a value less than the maximum number of frames associated with continuous display;

when a first input image is encoded with an encoding technology with bi-directional prediction and is input at a start of a first frame display period, and when one or more than one image encoded with bidirectional prediction is continuously input subsequent to the first input image:

delaying decoding of the image subsequent to the first input image in the continuously input bi-directional images by a given time from the start of a second frame display period that is subsequent to the first frame display period, and decoding the first input image in the continuously input bi-directional images substantially as soon as the first frame display period starts.

14. The method of claim 13, wherein the given time is one field period.

15. The method of claim 13, wherein decoding of the images subsequent to the input image that is subsequent to the first input image in the continuously input bi-directional frames is based on monitoring of the unit store areas in memory.

16. The method of claim 1, wherein the decoded input image data is stored in parts of the unit store area that become available when decoded input image data in that unit store area is read for display until a whole frame of input image data is stored.

* * * * *